United States Patent [19]

Nakata

[11] Patent Number: 5,003,435

[45] Date of Patent: Mar. 26, 1991

[54] AUTOMOTIVE LAMP ASSEMBLY

[75] Inventor: Yutaka Nakata, Isehara, Japan

[73] Assignee: Ichikoh Industries, Ltd., Tokyo, Japan

[21] Appl. No.: 547,048

[22] Filed: Jul. 2, 1990

Related U.S. Application Data

[62] Division of Ser. No. 348,917, May 8, 1989, Pat. No. 4,959,757.

[30] Foreign Application Priority Data

| | | | |
|---|---|---|---|
| May 9, 1988 | [JP] | Japan | 63-110420 |
| May 9, 1988 | [JP] | Japan | 63-110421 |
| May 17, 1988 | [JP] | Japan | 63-118182 |
| May 30, 1988 | [JP] | Japan | 63-130407 |
| Jun. 24, 1988 | [JP] | Japan | 63-155005 |
| Jun. 30, 1988 | [JP] | Japan | 63-160792 |

[51] Int. Cl.$^5$ .................................... B60Q 1/04

[52] U.S. Cl. .................................... 362/61; 362/304; 362/346

[58] Field of Search .................... 362/61, 80, 297, 304, 362/310, 346, 347, 348

[56] References Cited

U.S. PATENT DOCUMENTS

| | | | |
|---|---|---|---|
| 4,704,661 | 11/1987 | Kosmatka | 362/346 X |
| 4,811,174 | 3/1989 | Kanzler et al. | 362/297 X |
| 4,825,344 | 4/1989 | Ichihara et al. | 362/297 X |
| 4,841,423 | 6/1989 | Luciani | 362/297 X |

*Primary Examiner*—Stephen F. Husar

*Attorney, Agent, or Firm*—Foley & Lardner, Schwartz, Jeffery, Schwaab, Mack, Blumenthal & Evans

[57] ABSTRACT

The automotive lamp assembly according to the present invention comprises a divergent-type concave mirror formed by a central reflecting area in which the optical axis lies and peripheral reflecting areas continuously extending rightward and leftward from the central reflecting area, and a lamp bulb disposed on the optical axis of the concave mirror. Either one of the central and peripheral reflecting areas is formed as a first reflecting curved surface composed of a part of a paraboloid of revolution to reflect the incident rays of light from the lamp bulb in directions parallel to the optical axis, and the other is formed as a second reflecting curved surface to reflect horizontally the rays of light from the lamp bulb in directions divergent from the optical axis depending upon the distance from the vertical plane in which the optical axis lies and also reflect vertically the rays of light in directions parallel to each other and to the horizontal plane in which the optical axis lies. The first reflecting curved surface defines a central hot zone in the light distribution pattern, and the second reflecting curved surface defines middle and low illuminance zones extending rightward and leftward from the center of the light distribution pattern. Therefore, the rays of light from the lamp bulb can be effectively utilized and a desired light distribution pattern can be freely obtained.

7 Claims, 9 Drawing Sheets

AUTOMOTIVE LAMP ASSEMBLY

This application is a division of application Ser. No. 07/348,917, filed May 8, 1989, now U.S. Pat. No. 4,959,757.

BACKGROUND OF THE INVENTION (a) Field of the Invention

The present invention relates to an automotive lamp assembly, and more particularly to a lamp assembly having a reflector specially designed to provide a light distribution pattern which permits to make the most of the rays of light emitted from a lamp bulb of the lamp assembly provided on a car for illumination of the road surface before the car.

(b) Description of the Prior Art

FIG. 1 shows an example conventional automotive lamp assembly having a lamp housing 1 and a reflecting surface 1*a* integrally formed on the inner surface of the lamp housing 1 and which takes the form of a paraboloid of revolution. A lamp bulb 2 is disposed near the focus of the reflecting surface 1*a*, and a front lens 3 is disposed covering the front opening of the lamp housing 1 and as fixed to the circumferential edge of the front opening of the lamp housing. The front lens 3 has prisms formed on the inner surface thereof which faces the lamp bulb 2. If the reflecting surface 1*a* has the geometrical form of a paraboloid of revolution, namely, if both the section, of the reflecting surface 1*a*, along the vertical plane in which the optical axis Z and that along the horizontal plane in which the optical axis Z also lies take the form of a paraboloid, all the rays of light a emitted from the lamp bulb 2 are so reflected at the reflecting surface 1*a* in the directions parallel to the optical axis Z as to be beams b nearly parallel to each other. The parallel beams b are so refracted by the prisms on the front lens 3 as to be diverged in such directions as indicated by arrows c1 and c2, finally forming a predetermined light distribution pattern. Most of the light distribution patterns and their luminous intensity distributions from the automotive lamp assemblies have a reflector of a type of which the reflective surface is geometrically formed by quadrics such as a paraboloid of revolution, ellipsoid of revolution or the like or a combination of such different curved surfaces depends upon the front lens 3. However such conventional reflectors are limited in luminous intensity in many cases. The conventional automotive lamp assembly whose luminous intensity depends upon the reflector, not upon the front lens, typically employs a compound-curvature reflecting surface as disclosed in, for example, the U.S. Pat. No. 3,492,474. FIG. 2 is a schematic horizontal sectional view of a so-called divergent-type reflector, by way of example, which has a compound-curvature reflecting surface of which the vertical section has a parabolic curvature while the horizontal section has a hyperbolic curvature. The rays of light emitted from the lamp bulb 4 are so reflected at the reflecting surface of the reflector 5 as to be parallel beams in the vertical plane and divergent beams in the horizontal plane, the latter beams being diverged away from the optical axis. The reflector of this example lamp assembly is provided on the circumferential edge of the front opening thereof with a transparent cover 6 having no prisms formed on the inner surface thereof and which thus covers the front opening. So this lamp assembly needs no special lens configuration. However, this lamp assembly is disadvantageous in that as the luminous intensity at the central zone of the light distribution pattern is increased, that at the peripheral zone decreases, while the luminous intensity at the central zone decreases when that at the peripheral zone is increased. Namely, the luminous intensity distribution in the light distribution pattern cannot be freely controlled. Further, for more effective utilization of the beams from the lamp bulb, it is necessary to design a relatively large area of the front opening of the reflecting surface, that is, a relatively large horizontal width of the front lens. Therefore, the reflector having the above-mentioned configuration cannot be adopted in a relatively small lamp assembly. These problems greatly limit the freedom of designing the automotive lamp assemblies.

SUMMARY OF THE INVENTION

Accordingly, an object of the present invention is to overcome the above-mentioned drawbacks of the automotive lamp assemblies using the conventional so-called divergent-type reflector, by providing an automotive lamp assembly having a reflector specially designed to make the most of the rays of light emitted from the light source and which can be optimally used as headlamp, fog light, driving lamp or the like.

Another object of the present invention is to provide an automotive lamp assembly having a compact reflector so designed as to permit free control of the luminuous intensity in the light distribution pattern and of which the front opening area is relatively small.

A further object of the present invention is to provide an automotive lamp assembly which can effectively utilize also those of the rays of light emitted from a light source which are emitted directly frontward.

These and other objects and advantages of the present invention will be better understood from the ensuing description made, by way of example, of the embodiments of the present invention with reference to the drawings.

BRIEF DESCRIPTION OF THE DRAWINGS

FIGS. 3 (A) thru (C) are schematic views, respectively, for explanation of the construction and function of the reflector, FIG. 3 (A) showing a section of the reflector taken along the horizontal plane in which the optical axis lies; FIG. 3 (B) being a schematic front view of the reflector; and FIG. 3 (C) showing a section of the reflector taken along the vertical plane in which the optical axis lies; FIG. 4 is a drawing for explaining how to determine the orientations of the minute surface elements forming the reflecting surface of the reflector; and FIGS. 5 (A) schematically shows a light distribution pattern projected onto a screen from a lamp using the reflector shown in FIGS. 3 (A) thru (C); and FIG. 5 (B) is also a schematic view of the luminous intensity distribution along the line H—H in the light distribution pattern;

FIGS. 6 (A) and (B) are schematic views, respectively, for explanation of the construction and function of the reflector and which correspond to FIGS. 3 (A) and (B), respectively, of the first embodiment, and FIGS. 7 (A) thru (C) are schematic views, respectively, showing the entire shape of the lamp assembly, FIG. 7 (A) being a sectional view of the lamp assembly taken along the horizontal plane in which the optical axis of the reflector lies, FIG. 7 (B) showing that the horizontal width of the front lens is smaller than that of the reflector opening, and FIG. 7 (C) being a sectional view of the lamp assembly taken along the vertical plane in which the optical axis of the reflector lies;

FIGS. 8 (A) and (B) being schematic views, respectively, for explanation of the construction and function of the reflector and which correspond to FIGS. 3 (A) and (B), respectively, of the first embodiment, and FIG. 9 being a schematic view showing the entire shape of the lamp assembly and which corresponds to FIGS. 7 (A) and (B);

FIGS. 10 (A) and (B) being schematic views, respectively, for explanation of the construction and function of the reflector and which correspond to FIGS. 3 (A) and (B) of the first embodiment, and FIG. 11 being a schematic sectional view of the lamp assembly taken along the horizontal plane in which the optical axis of the reflector lies;

FIG. 12 being a schematic view for explanation of the construction and function of the reflector and spheric concave mirror, the construction of the reflector being substantially the same as that in the fourth embodiment, and FIG. 13 being a schematic sectional view of the lamp assembly taken along the horizontal plane in which the optical axis of the reflector; FIG. 14 being a schematic view for explanation of the construction and function of the reflector and Fresnel lens, the construction of the reflector being substantially the same as that of the reflector in the fourth embodiment, and FIG. 15 being a schematic sectional view of the lamp assembly taken along the horizontal plane in which the optical axis of the reflector lies.

DETAILED DESCRIPTION OF THE PREFERRED EMBODIMENTS

Figure 1:
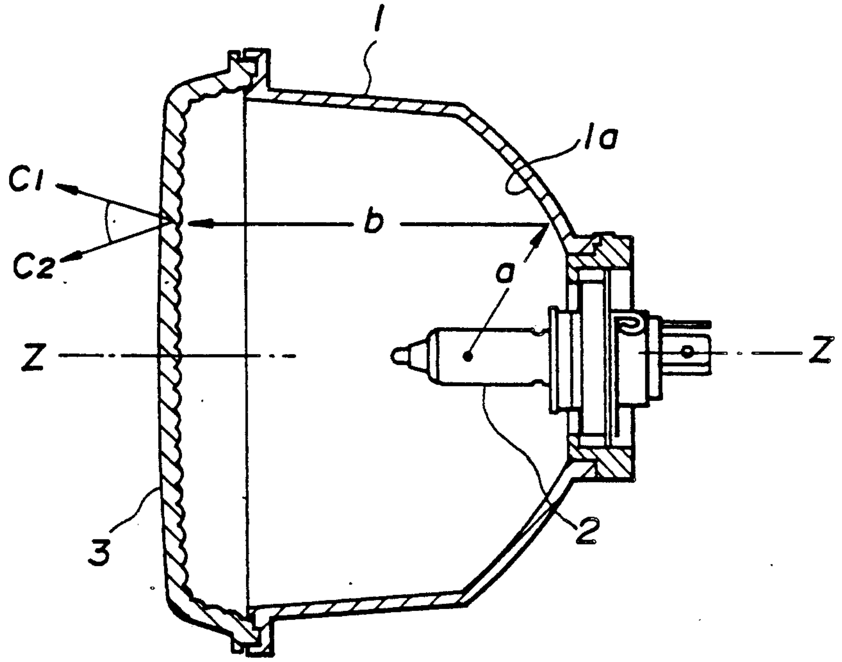
FIG. 1 (PRIOR ART)
FIGS. 1 and 2 are schematic views, respectively, for explaining the conventional automotive lamp assemblies.
Figure 2:
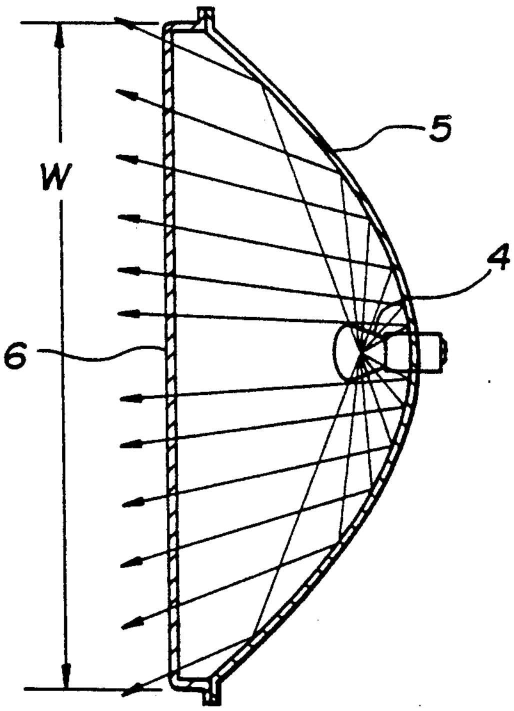
FIG. 2 (PRIOR ART)
Figure 3A:
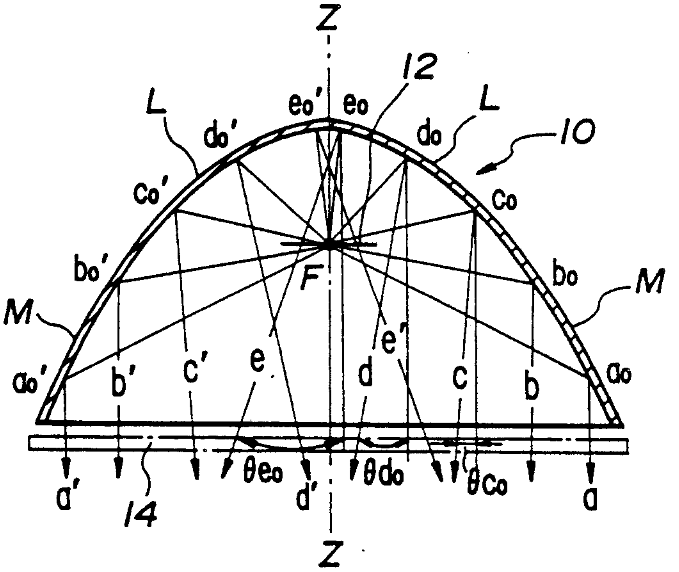
FIGS. 3 thru 5 show an embodiment of the automotive lamp assembly according to the present invention.
Figure 3B:
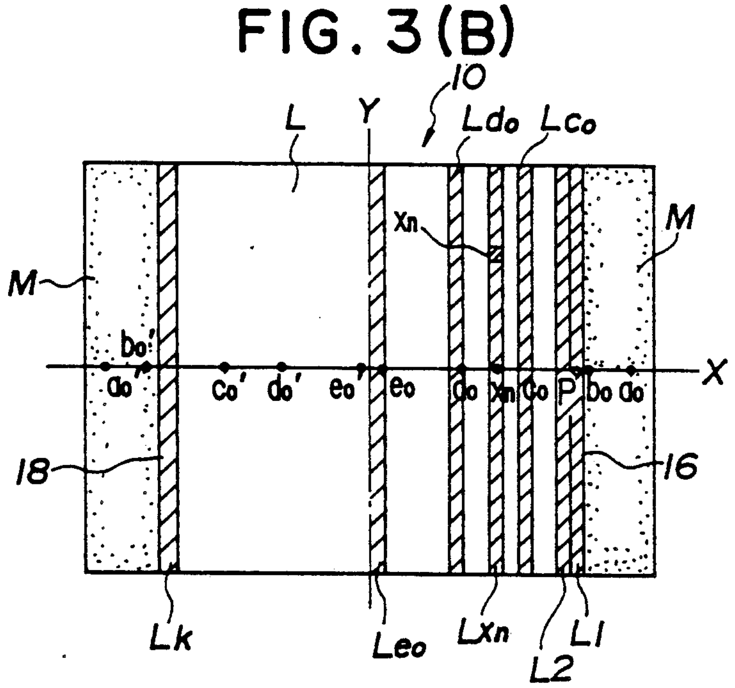
Figure 3C:
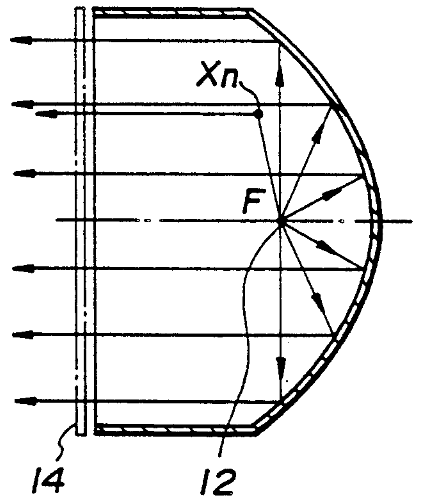
Figure 4:
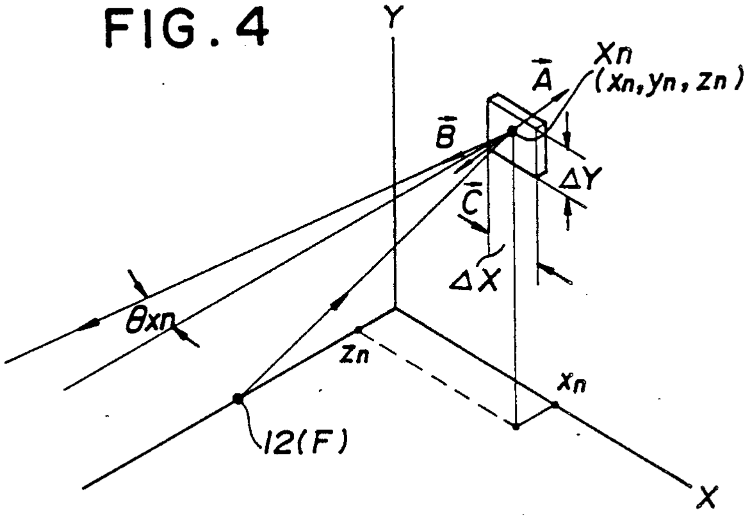
Figure 5A:
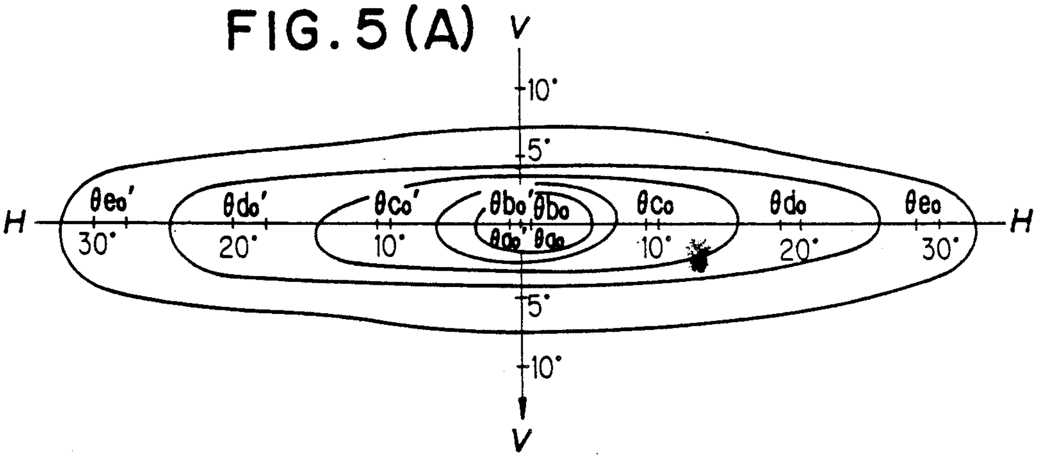
Figure 5B:
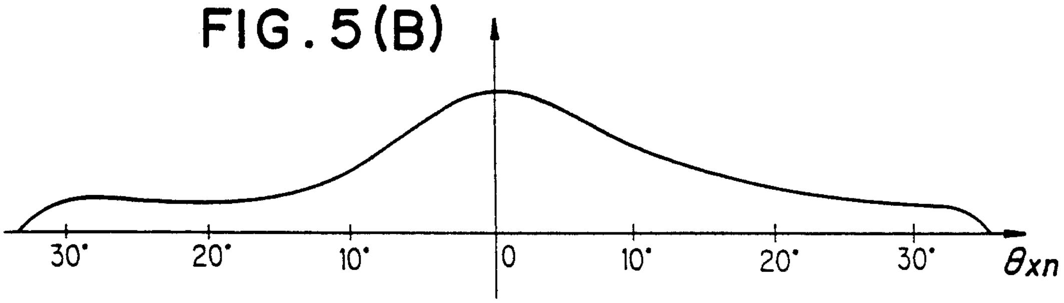

FIGS. 3 thru 5 show together a first embodiment of the automotive lamp assembly, as headlamp, according to the present invention. FIGS. 3 (A) thru (C) show the basic construction of the headlamp according to the present invention. The headlamp comprises a reflector 10 made of a concave mirror 10, a lamp bulb 12 disposed on the optical axis Z—Z of the reflector 10, and a transparent front cover 14 covering the opening of the reflector 10. According to this embodiment, the reflector 10 is formed integrally with a part of the housing (not shown). The center of the filament F of the lamp bulb 12 is so positioned a to generally coincide with the focus of the reflector 10 as will be further described later. As shown, the reflector 10 consists of a central reflecting area L including the apex intersecting the optical axis and two peripheral reflecting areas M continuously extending rightward and leftward from the central reflecting area L. Each of the peripheral reflecting areas M is formed as a first reflecting curved surface consisting of a part of a paraboloid of revolution, which reflects the rays of light emitted from the lamp bulb 12 in the directions parallel to the optical axis Z—Z. Namely, the center of the filament F is disposed on the focus of the paraboloid of revolution. On the contrary, the central reflecting area L is formed as a second reflecting curved surface which reflects horizontally the rays of light emitted from the lamp bulb 12 in directions more convergent toward the optical axis Z—Z as the distances from their reflecting points to the vertical plane (YZ plane) in which the optical axis Z—Z lies are shorter, while reflecting vertically the rays of light in directions parallel to each other and to the horizontal plane in which the optical axis lies. As seen from FIG. 3 (B), the boundaries between the central reflecting area L and peripheral reflecting areas M are in two vertical planes 16 and 18 positioned in symmetry with respect to the vertical plane (YZ plane) in which the optical axis Z—Z lies. The reflector 10 according to the present invention has such a reflection characteristic that the rays of light emitted from the lamp bulb 12 are substantially restricted from diverging or converging in the vertical direction (Y-axial direction) of the reflector 10 while they are allowed to diverge only in right-left horizontal directions (horizontally). In this embodiment, the central reflecting area L has such a reflection characteristic that the rays of light emitted from the lamp bulb 12 are reflected horizontally in directions convergent toward the optical axis Z—Z, namely, the central reflecting area L is formed by a reflecting curved surface which converges the reflected rays of light. The convergence is larger as the reflecting points are nearer to the apex, while it is smaller as the reflecting points are away from the vertical plane (YZ plane) and nearer to the peripheral reflecting areas M.

The aforementioned central reflecting area L is formed by multiple minute reflecting surface elements as disclosed in the copending U.S. patent application Ser. No. 072,972 (filed on June 23, 1987) by the Inventor of the present invention and each of the minute reflecting surface elements is so orienated as to have a predetermined reflection characteristic. This will be described in further detail below. As is seen from FIG. 3 (B), the central reflecting are L is composed of a group having multiple elongated reflecting areas L1, L2, . . . , Lk along lines of intersection between the reflector and multiple planes parallel to the vertical plane (YZ plane) in which the optical axis lies, each of the reflecting areas comprising multiple minute reflecting surface elements of which the adjoining ones are smoothly contiguous to each other. Each of the minute reflecting surface elements is designed to have an extremely small area $\Delta S = \Delta X\ \Delta Y$ (in this embodiment, $\Delta X = 0.01$ mm, $\Delta Y = 0.01$ mm and $\Delta S = 10^{-4}$ mm$^2$) In FIG. 3 (B), the symbols ao and bo indicate points, respectively, located within the peripheral reflecting areas M and of which the X-coordinates are ao and bo, respectively, and the symbols co, do and eo indicate points, respectively, located within the central reflecting area L and of which the X-coordinates are co, do and eo, respectively. The points symmetrical to the points ao, bo, co, do and eo (ao>bo>co>do>eo), respectively, with respect to the vertical plane (YZ plane) in which the optical axis Z—Z lies are indicated with symbols ao', bo', co', do' and eo', respectively. The minute reflecting surface elements belonging to the elongated reflecting area Lco along a line of intersection between the reflector and a plane defined with an equation X=co are so orientated as to reflect horizontally the rays of light incident from the lamp bulb 12 in directions convergent toward the optical axis with an angle of θco with respect to the optical axis, while reflecting vertically the incident rays of light in directions parallel to the horizontal plane in which the optical axis lies.

Similarly, the minute reflecting surface elements belonging to the elongated reflecting areas Ldo and Leo along lines of intersection between the reflector and planes defined by equations X=do and X=eo, respectively, are so orientated as to reflect horizontally the rays of light incident from the lamp bulb 12 in directions convergent toward the optical axis with angles θdo and θeo, respectively, with respect to the optical axis, while reflecting vertically the incident rays of light in directions parallel to each other and also to the horizontal plane in which the optical axis lies. These reflected rays of light are indicated with symbols c, d and e, respectively. The angles θco, θdo and θeo are in a relation of θco<θdo<θeo. Namely, the minute reflecting surface elements belonging to a reflecting area nearer to the optical axis reflect the rays of light with larger angles with respect to the optical axis. Similarly, the minute reflecting surface elements belonging to the elongated reflecting areas corresponding to the points co', do' and eo', respectively, are so orientated as to reflect, in a horizontal plane, the rays of light incident from the lamp bulb 12 in directions convergent toward the optical axis with angles θco, θdo and θeo, respectively, with respect to the optical axis, while reflecting vertically the incident rays of light in directions parallel to each other and also to the horizontal plane in which the optical axis lies. Thus, it will be apparent that the rays of light reflected at the elongated reflecting areas corresponding to the points co, do and eo, respectively, and to the points co', do' and eo', respectively, intersect each other in front of the reflector 10 and thereafter they become divergent beams.

An arbitrary minute reflecting surface element is orientated as will be described below. The orientation of a minute reflecting surface element including a point Xn of which the coordinates are (xn, yn, zn) will be discussed by way of example. The incident ray of light from the center F of the lamp bulb 12 is indicated with a unit vector $\vec{A}$, the ray of light reflected at the point Xn is with a unit vector $\vec{B}$, and the unit normal vector of the minute reflecting surface element passing through the point Xn is with a unit vector $\vec{C}$. There is a following relation between these vectors:

$$\vec{B}=\vec{A}+2K\vec{C} \tag{1}$$

where K is a constant.

In the case where the reflected ray of light $\vec{B}$ is so restricted from diverging in the Y-direction as to be diverged only in the horizontal plane with an angle θxn with respect to the optical axis, the reflected ray of light $\vec{B}$ can be expressed as follows:

$$\vec{B}=\begin{pmatrix}\sin\theta xn\\0\\\cos\theta xn\end{pmatrix} \tag{2}$$

The normal vector $\vec{C}$, and therefore a plane equation of the minute reflecting surface element, are based on the coordinates of the point Xn calculated from the above equations (1) and (2).

Practically, a point P within a reflecting area L1 next to the peripheral reflecting area M formed by a part of a paraboloid of revolution is taken as a calculative reference point representative of the minute reflecting surface element and a plane equation is first obtained for the reference reflecting surface element. Thereafter, a plane equation is obtained for another point within the reflecting area L1 and adjacent to the reference point P to have a convergence at a predetermined angle. Plane equations are obtained for the rest of the reflecting surface elements within the reflecting area L1 to have respective convergences at predetermined angles. Similarly, plane equations can be obtained for the minute reflecting surface elements within the respective adjoining reflecting areas L2, . . . , Lk to have respective convergences at predetermined angles. The curved surface formed by such multiple minute reflecting surface elements which are smoothly and continuously connected to each other is a curved surface of which the curvature varies continuously, and thus it can be relatively easily formed by an NC (numerically controlled) machining.

A functional relation can be established between the angle θxn formed by the ray of light reflected at the point Xn representative of the above arbitrary minute reflecting surface element with respect to the optical axis, and the X-coordinate xn of the point Xn. This functional relation is set depending upon an intended light distribution pattern, that is, upon whether the intended light distribution pattern is applied for a headlamp or fog lamp. For example, it is possible to obtain a luminous intensity distribution of an intended light distribution pattern as a function of the angle θxn formed by the reflected ray of light with respect to the optical axis, and to thereafter approximately set, based on the beam divergence value of the lamp bulb, the divergence or convergence angle θXn with respect to the point Xn representative of the arbitrary minute reflecting surface element by using a power series or power function of xn. As such functional relation (θxn=F(xn)), a variety of functions as well as a power series or power function of xn can be used for the ray of light reflected at an arbitrary reflecting surface element to be diverged only horizontally (rightward and leftward) (horizontal divergence), not vertically (in the Y-direction).

FIG. 5 (A) shows a light distribution pattern, on a screen, of a headlamp having the reflector 10 shown in FIG. 3 (A), and FIG. 5 (B) shows a luminous intensity distribution along the line H—H of the light distribution pattern. All the rays a and b, and a' and b' of light reflected at the two peripheral reflecting areas M, respectively, formed by a paraboloid of revolution travel in directions parallel to the optical axis, thus defining a high zone, that is, a high illuminance zone (indicated with θao, θao', θbo and θbo') at the center of the light distribution pattern. It will be obvious that the rays of light reflected at the elongated reflecting areas Lco, Ldo and Leo of the central reflecting area L define a middle and low illuminance zones (defined by θco, θco', θdo and θdo', θeo and θeo', respectively) rightward and leftward extending in ranges of about 10, 20 and 30 deg., respectively, from the center of the light distribution pattern. The headlamp according to this embodiment is characterized in that the orientations $\vec{C}$ of the minute reflecting surface elements belonging to the elongated reflecting area Lxn within the central reflecting area L of the reflector can be so selected such that the reflected rays of light converge horizontally with a predetermined angle $\theta xn$ with respect to the optical axis while traveling in directions parallel to each other and also to the horizontal plane in which the optical axis lies. Therefore the rays of light emitted from the light source can be effectively used and any desired light distribution pattern can be freely set. Moreover, since the angle, with respect to the optical axis, of the rays of light reflected by the reflector is gradually smaller from the center of the central reflecting area L toward the two peripheral reflecting areas M and the angle, with respect to the optical axis, of the rays of light reflected at the two peripheral reflecting areas M is substantially zero, namely, the reflected rays of light are parallel to the optical axis, it is not necessary that the width of the front opening of the reflector should be large for the purpose of making the most of the rays of light emitted from the light source as with the conventional techniques, and so it is possible to construct a reflector which is compact as a whole, that is, a compact headlamp assembly. Also since the front cover can be designed to have a nearly same shape as the front opening of the reflector, the consideration to be taken, in designing a head lamp, against the influence of the arrangement of the members around the front opening of the reflector on the reflected beams may be minimum. Hence, this embodiment is advantageous in that the headlamp assembly can be designed with a higher freedom.

In this embodiment, the transparent front cover 14 is disposed covering the front opening of the reflector 10, but it should be noted that since the cover 14 has no function like a prism which refracts the rays of light emitted from the light source, it will not have any influence on the light distribution pattern.

Figure 6A:
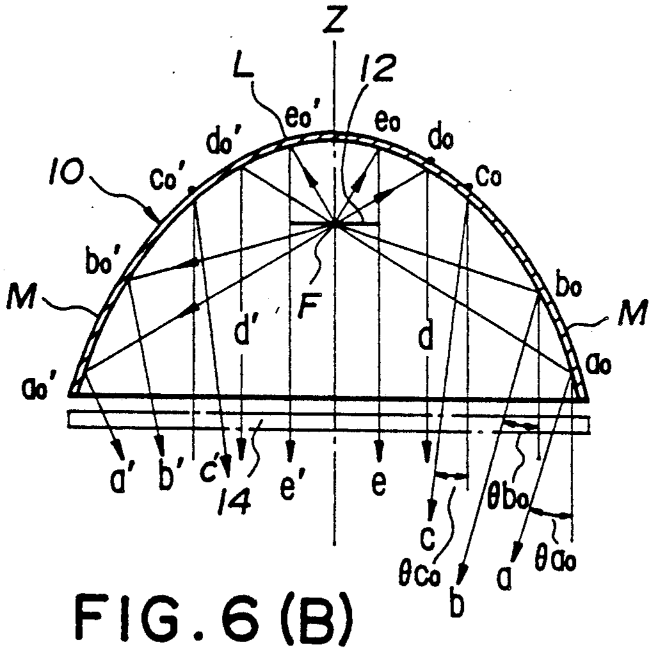
FIGS. 6 and 7 show a second embodiment of the automotive lamp assembly according to the present invention.
Figure 6B:
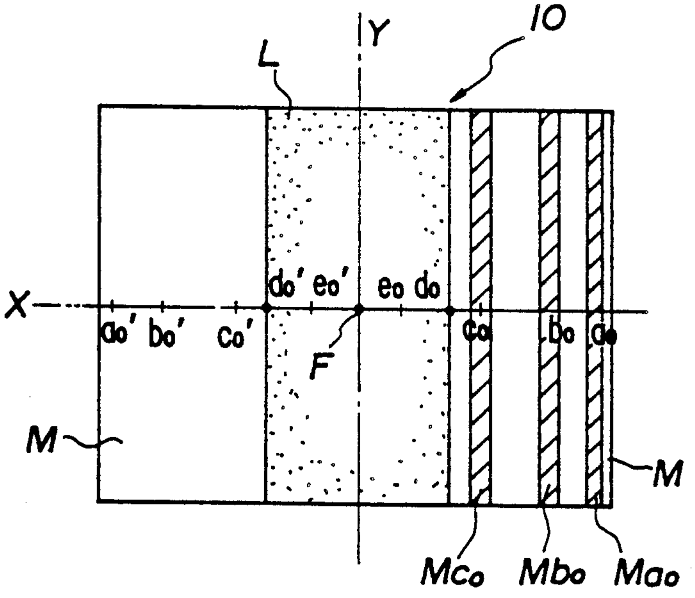
Figure 7A:
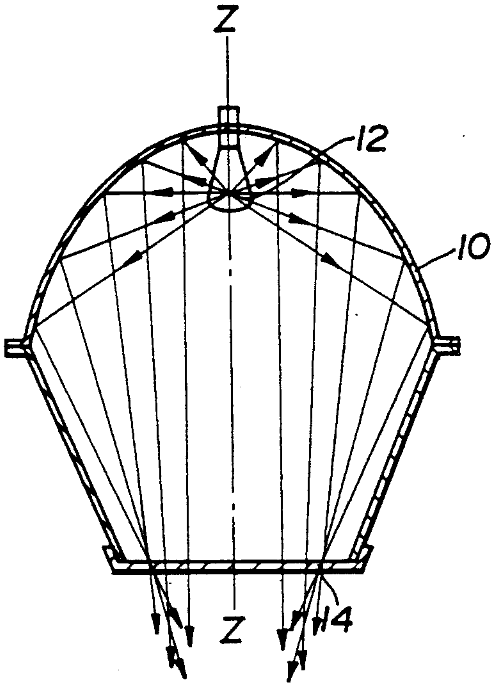
Figure 7B:
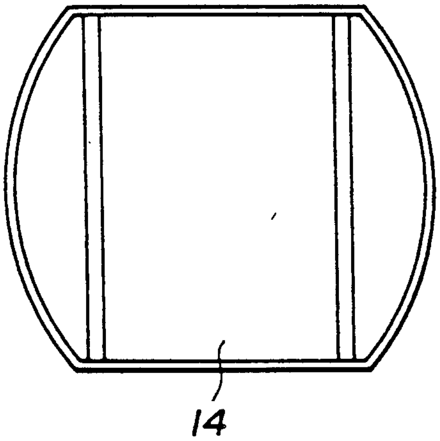
Figure 7C:
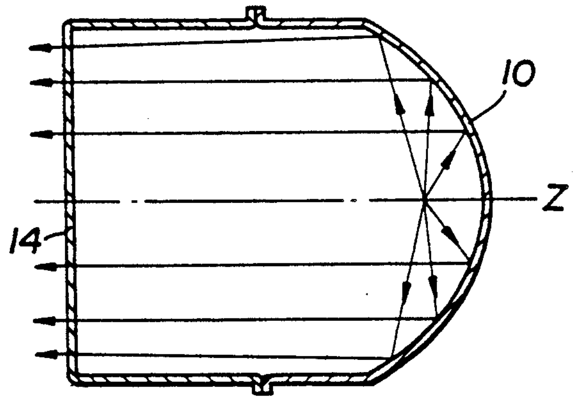

FIGS. 6 and 7 show a second embodiment of the headlamp according to the present invention. The same or similar elements as or to those in the first embodiment are indicated with the same or similar reference numerals. According to this second embodiment, the central reflecting area L is formed by a paraboloid of revolution, and the peripheral reflecting areas M are so designed as to reflect horizontally the rays of light emitted from the lamp bulb 12 in directions convergent toward the optical axis as the distance from the vertical plane (YZ plane) in which the optical axis lies is smaller and also to reflect vertically the rays of light in directions parallel to each other and to the horizontal plane in which the optical axis lies. In the first embodiment, the multiple minute reflecting surface elements in the central reflecting area L are so orientated as to provide a larger convergence of the reflected rays of light as they are nearer to the apex of the reflector and a smaller convergence as they are nearer to the peripheral reflecting areas M. However, it will be understood that in the second embodiment, the peripheral reflecting areas M are composed of many minute reflecting surface elements which are so orientated as to provide a larger convergence of the reflected rays of light as they are nearer to the front opening of the reflector while providing a smaller convergence as they are nearer to the central reflecting surface elements L.

In FIGS. 6 and 7, the points ao, bo, co, ao', bo' and co' are shown as typical points of the minute reflecting surface elements within the peripheral reflecting areas M, and the points do, do', eo and eo' are shown as typical points of the minute reflecting surface elements within the central reflecting area L. All the rays of light d, d', e and e' reflected at the points do, do', eo and eo', respectively, within the central reflecting area L travel in directions parallel to the optical axis, thus defining a high illuminance zone in the center of the light distribution pattern. On the other hand, the minute reflecting surface elements belonging to the elongated reflecting areas Mao, Mbo and Mco along lines of intersection between the reflector and the planes defined by equations X=ao, X=bo and X=co, respectively, are so orientated as to reflect horizontally the incident rays of light from the lamp bulb 12 in directions convergent toward the optical axis with angles $\theta ao$, $\theta bo$ and $\theta co$ ($\theta ao > \theta bo > \theta co$) with respect to the optical axis and to reflect vertically the rays of light in directions parallel to each other and to the horizontal plane in which the optical axis lies. The reflected rays of light a, b, c, a', b' and c' define middle and low illuminance zones extending rightward and leftward from the center of the light distribution pattern. According to this embodiment, a luminous intensity distribution in a light distribution pattern (not shown), which is nearly the same as that shown in FIG. 5 (B), can be provided by appropriately selecting the shape of the paraboloid of revolution which forms the central reflecting area L, areas of the central reflecting area L and peripheral reflecting areas M, angles of reflected rays of light within the peripheral reflecting areas M with respect to the optical axis, and the like.

FIGS. 7 (A) thru (C) schematically show the shape of a headlamp as a whole using the reflector having been described in the above. Similarly to the first embodiment, since any desired light distribution pattern can be determined depending upon the configuration of the reflector, so the front cover 14 needs no prismatic function. Also, since the reflected rays of light in the peripheral reflecting areas M travel in directions convergent toward the optical axis , the width of the front cover 14 can be made smaller than that of the front opening of the reflector 10. Therefore, the reflector according to this embodiment can be advantageously applied to a headlamp of a type of which the distance between the lamp bulb and front cover is relatively long.

Figure 8:
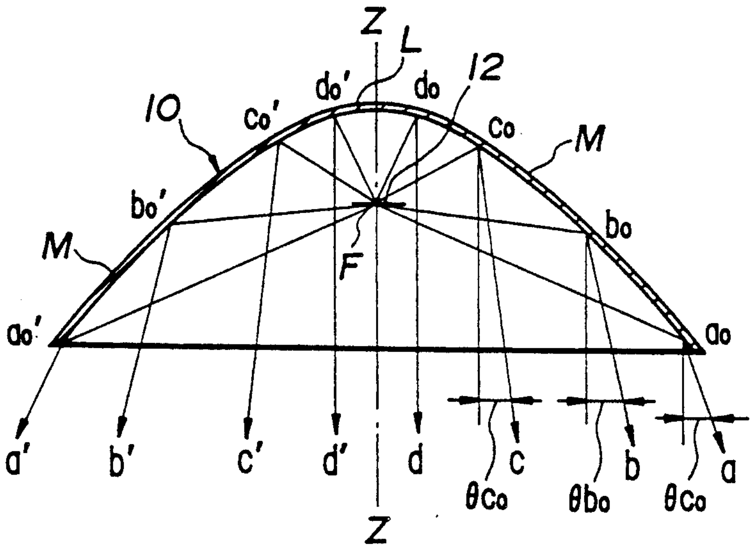
FIGS. 8 and 9 show a third embodiment of the automotive lamp assembly according to the present invention.
Figure 8:
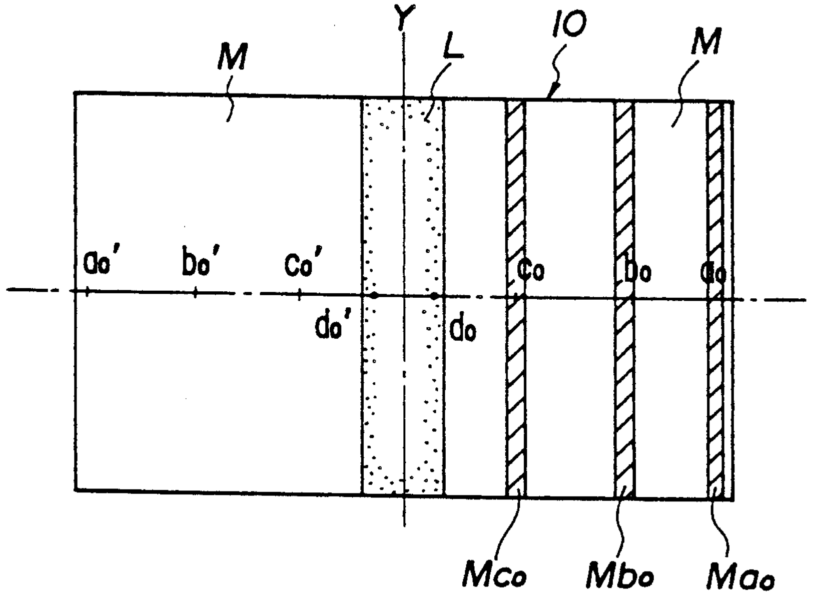
Figure 9:
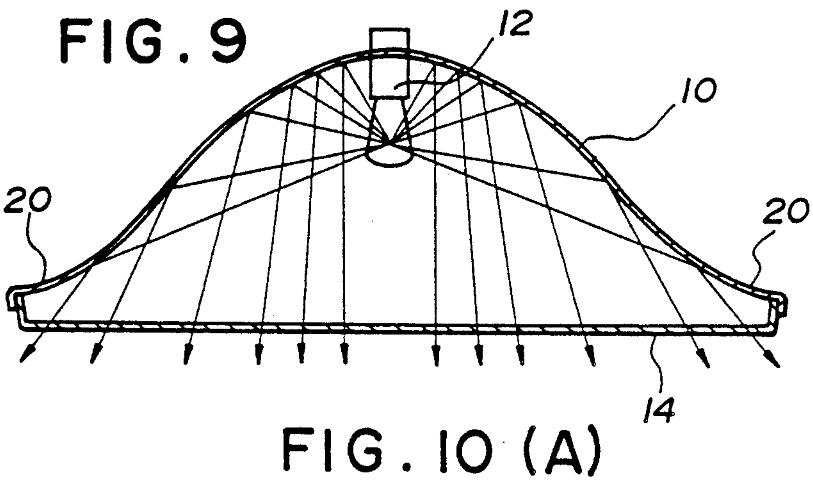

FIGS. 8 and 9 show a third embodiment of a headlamp according to the present invention. In Figures, the same or similar elements as to to those in the second embodiment are indicated with the same or similar reference numerals. In the third embodiment, the central reflecting area L is formed by a paraboloid of revolution, and the peripheral reflecting areas M are so formed as to reflect horizontally the rays of light emitted from the lamp bulb 12 in directions divergent from the optical axis as the distance from the vertical plane in which the optical axis lies is longer and also to reflect vertically the rays of light in directions parallel to each other and to the horizontal plane in which the optical axis lies. This embodiment is common to the aforementioned second embodiment in that the central reflecting area L is formed by a paraboloid of revolution, but different from the second embodiment in the reflection characteristic of the peripheral reflecting areas M. Namely, the minute reflecting surface elements belonging to the elongated reflecting areas Mao, Mbo and Mco, respectively, represented by the points ao, bo and co, respectively, are so orientated as to reflect horizontally the rays of light emitted from the lamp bulb 12 in directions divergent from the optical axis with angles $\theta ao$, $\theta bo$ and θco (θao>θbo>θco) and to reflect vertically the rays of light in directions parallel to each other and to the horizontal plane in which the optical axis lies. It will be obvious that the divergences of the reflected rays of light in the peripheral reflecting areas M are smaller as the minute reflecting surface elements are nearer to the central reflecting area L while they are larger as the distances from the optical axis are longer.

The points do and do' are shown as the points representative of the central reflecting area L. The rays of light d and d' reflected at these points of the central reflecting area L travel in directions parallel to the optical axis, thus defining a hot zone in the center of the light distribution pattern, which is the same as in the aforementioned embodiments. On the other hand, the rays of light a, b, c, a', b' and c' reflected at the points ao, bo, co, ao', bo' and co', respectively, representative of the peripheral reflecting areas M travel in directions gradually divergent from the optical axis with angles θao, θbo and θco, respectively, with respect to the optical axis, thus defining a middle and low illuminance zones extending rightward and leftward from the center of the light distribution pattern, which is the same as in the aforementioned embodiments. According to the present invention, the lateral width or area of the central reflecting area L can be made relatively smaller than the lateral width or area of the peripheral reflecting areas M, so that a reflector as a whole can be designed with a small depth in the direction of the optical axis as compared with the lateral width of the front opening. The overall shape of the headlamp with a reflector 10 which has the aforementioned reflection characteristic is shown in FIG. 9 from which it will be seen that the circumferential portion 20 of the front opening of the reflector 10 is not formed as any substantial reflecting surface but as a fixture for the transparent front cover 14 which has no lens function.

Figure 10:
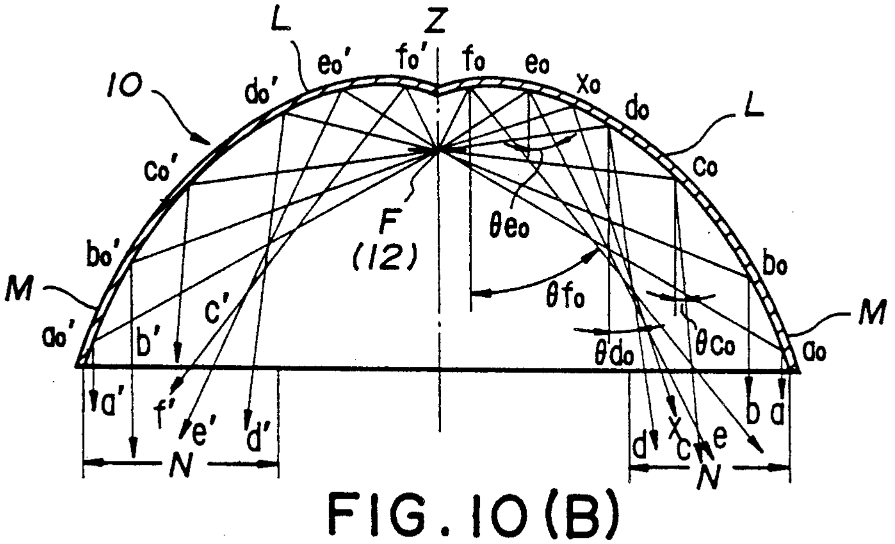
FIGS. 10 and 11 show a fourth embodiment of the automotive lamp assembly according to the present invention.
Figure 10:
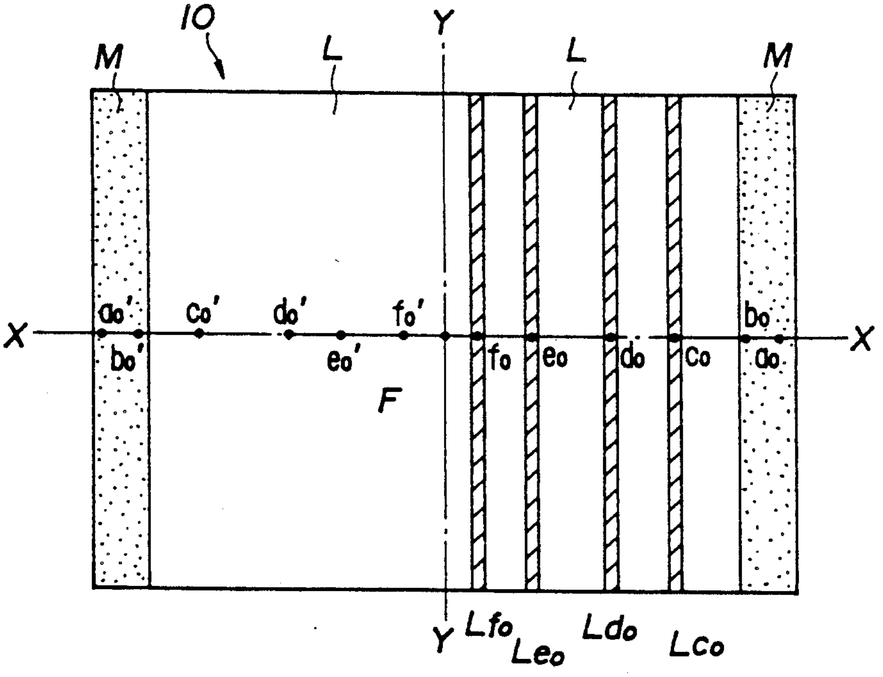
Figure 11:
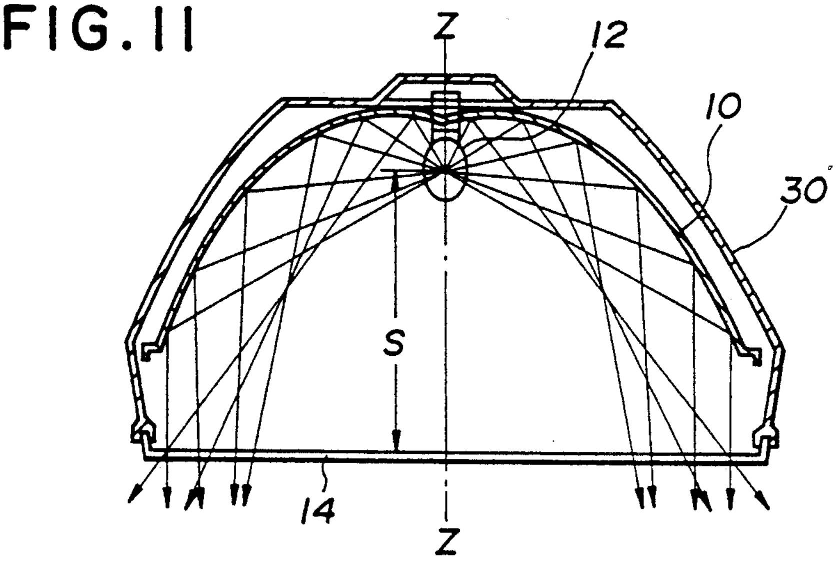

FIGS. 10 and 11 show a fourth embodiment of a headlamp according to the present invention. As shown in FIG. 10 (A), the reflector 10 according to this embodiment takes the form of a reflecting curved surface having two apexes. The portion near the intersection of the curved surface with the optical axis Z—Z is formed as somewhat concave toward the front opening. As shown in FIG. 10 (B), the central reflecting area L has a relatively large area as compared with the right and left peripheral reflecting areas M. The peripheral reflecting areas M are formed by a part of a paraboloid of revolution which reflects the rays of light emitted from the lamp bulb 12 in directions parallel to the optical axis, namely, the center of the filament F of the lamp bulb 12 is positioned on the focus of the paraboloid of revolution. On the other hand, the central reflecting area L is so formed as to reflect horizontally the rays of light emitted from the lamp bulb 12 in directions divergent from the optical axis depending upon the distance from the vertical plane in which the optical axis lies and also to reflect the rays of light horizontally in vertical planes. The ones nearer to the optical axis of the multiple elongated reflecting areas forming the central reflecting area of the reflector 10 are so designed as to reflect the rays of light emitted from the lamp bulb 12 in directions divergent from the optical axis with larger angles with respect to the optical axis. Namely, the reflecting areas nearer to the optical axis have larger divergences while the reflecting areas nearer to the peripheral reflecting areas M have smaller divergences. As having been described with reference to the first embodiment, the multiple elongated reflecting areas are formed by many minute reflecting surface elements. The minute reflecting surface elements within a same reflecting area are so orientated as to reflect the rays of light emitted from the lamp bulb 12 in directions divergent from the optical axis with a same angle with respect to the optical axis. As shown in Figures, the points ao and bo and the points ao' and bo' symmetrical to the points ao and bo, respectively, with respect to the vertical plane in which the optical axis lies, are the points within the peripheral reflecting areas M having the x-coordinates ao, bo, and ao' and bo', respectively, and the points co, do, eo and fo and the points co', do', eo' and fo' symmetrical to the points co, do, eo and fo, respectively, are the points within the central reflecting area L having the X-coordinates co, do, eo, fo, co', do', eo', fo', respectively. The elongated reflecting areas Lco, Ldo, Leo and Lfo in the central reflecting area L are represented by the points co, do, eo and fo (co>do>eo>fo), and the rays of light reflected at these reflecting areas form angles θco, θdo, θeo and θfo (θco<θdo<θeo<θfo) with respect to the optical axis in the horizontal plane. Similarly, the rays of light reflected at the elongated reflecting areas corresponding to the points co', do', eo' and fo', respectively, form angles θco, θdo, θeo and fo with respect to the optical axis in the horizontal plane. The angle of divergence θ is so selected that the rays of light reflected at the central reflecting area L are incident upon the peripheral reflecting areas M and pass through the predetermined areas N near the front opening of the reflector 10 through which the rays of light reflected in directions parallel to the optical axis in the vertical plane. Therefore, the rays of light passing through an area other than the above-mentioned predetermined areas N of the front opening of the reflector 10 are those emitted frontward from the lamp bulb 12 and which are not substantially contributed to the light distribution pattern, but the rays of light reflected by the reflector 10 pass through the predetermined areas N and are utilized to form a predetermined light distribution pattern.

The shape of the headlamp according to this embodiment is schematically shown in FIG. 11. The reflector 10 is fixed in a lamp housing 30. The reflection characteristic, that is, the divergence of the rays of light reflected at the central reflecting area L is smaller as the reflecting points are farther from the optical axis and the rays of light reflected at the peripheral reflecting areas M travel in directions parallel to the optical axis. Hence, the front cover 14 having no substantial lens function may not always be disposed on the circumferential edge of the front opening of the reflector 10 but it is installed on the front opening of the lamp housing 30 located at a position more frontward of the front opening of the reflector 10. It means that selection of a relatively long distance S between the lamp bulb 10 and the front cover 14 will not influence the light distribution pattern in case of a headlamp using the reflector 10 according to this embodiment.

Also, since the rays of light reflected at the central reflecting area L and peripheral reflecting areas M of the reflector 10 pass through the predetermined areas N positioned at the right and left of the front opening and are contributed to definition of a predetermined light distribution pattern, the light source may be split at two locations, right and left.

Figure 12:
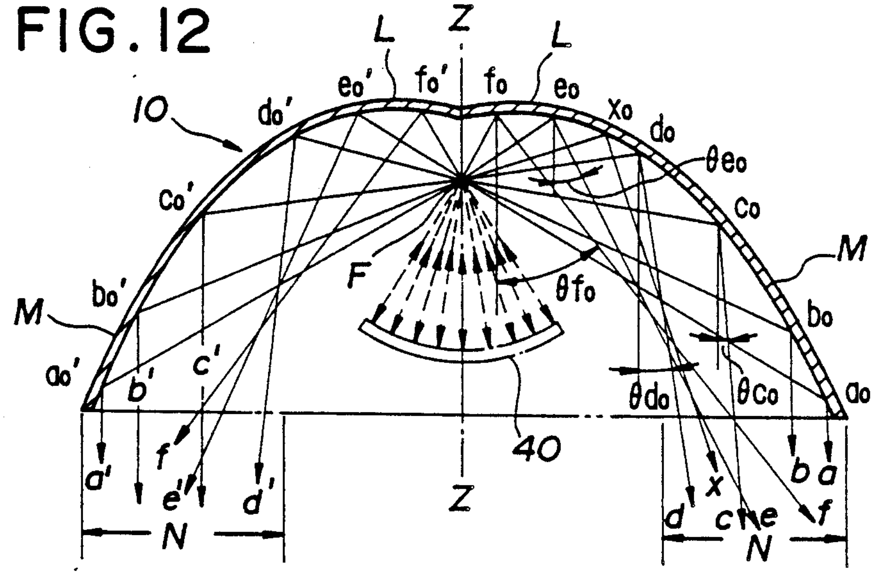
FIGS. 12 and 13 show a fifth embodiment of the automotive lamp assembly according to the present invention.
Figure 13:
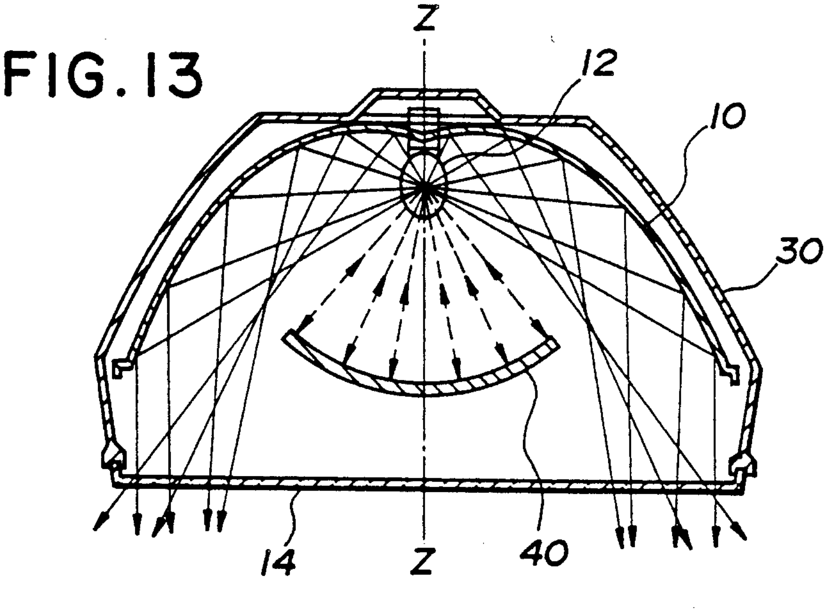

FIGS. 12 and 13 show a fifth embodiment of the headlamp according to the present invention. The configuration of the reflector 10 and the outside shape of the headlamp are the same as those in the above-mentioned fourth embodiment. According to this fifth embodiment, a spherical concave mirror 40 is disposed between the lamp bulb 12 and the center of the front opening of the reflector 10. The center of the mirror 40 nearly coincides with the center F of the filament. For effective utilization of the rays of light emitted frontward directly from the lamp bulb 12, the mirror 40 reflects once the rays of light backward toward the central reflecting area L. The rays of light emitted frontward directly from the lamp bulb 12 are reflected on the spherical concave mirror 40, pass near the lamp bulb 12 and are incident near the center of the central reflecting area L. Therefore, the illuminances at the middle and low illuminance zones extending rightward and leftward from the hot zone at the center of the light distribution pattern can be increased as compared with the fourth embodiment.

Figure 14:
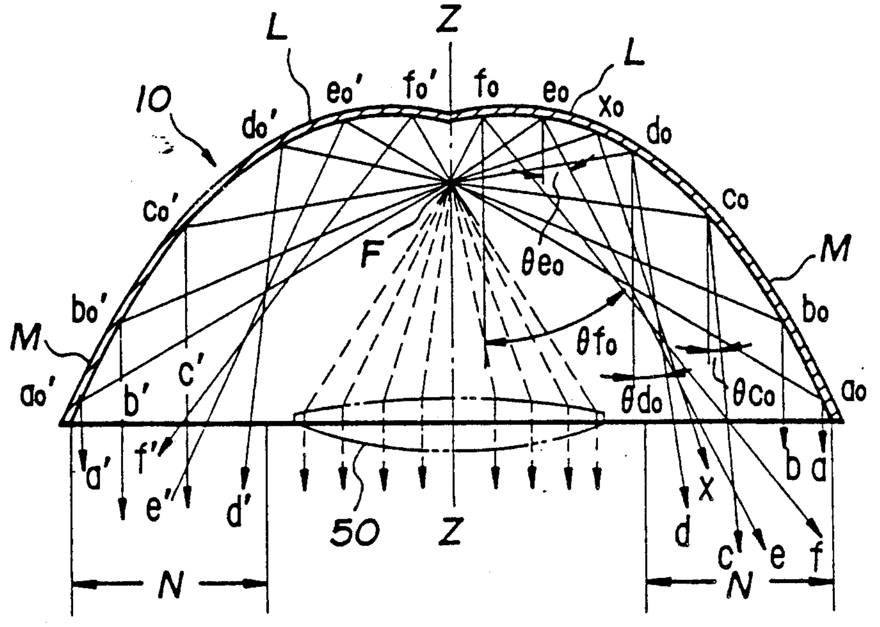
FIGS. 14 and 15 show a sixth embodiment of the automotive lamp assembly according to the present invention.
Figure 15:
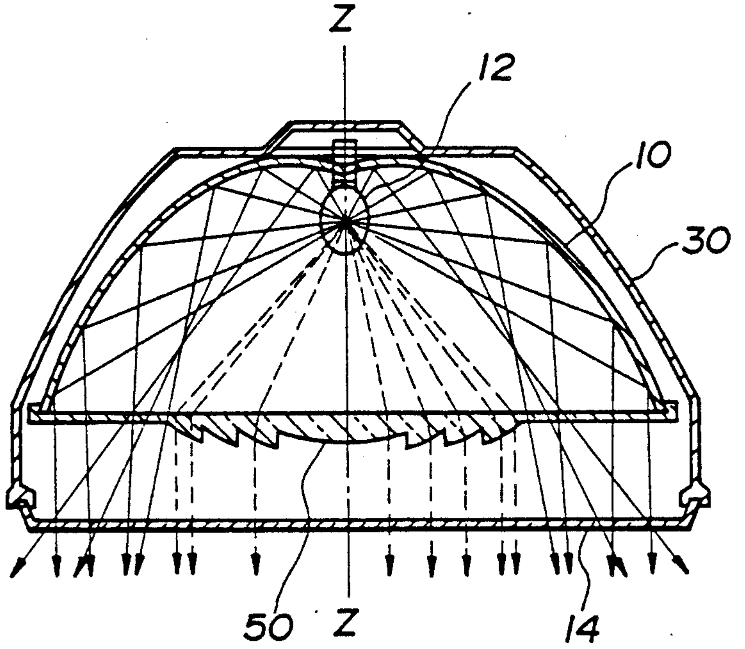

FIGS. 14 and 15 show a sixth embodiment of the headlamp according to the present invention. The configuration of the reflector 10 is the same as that in the fourth embodiment. According to this sixth embodiment, there is provided in the area of the front opening of the reflector 10, except for the areas N through which the rays of light reflected at the central reflecting area L and those reflected at the peripheral reflecting areas M, a lens 50 which refracts the rays of light emitted frontward directly from the lamp bulb 12 in directions nearly parallel to the optical axis. The disposition of such lens 50 permits to increase the illuminance at the hot zone in the center of the light distribution pattern. As shown in FIG. 15, the lens 50 is made in the form of a Fresnel lens which covers the front opening of the reflector 10 and is fixed on the circumferential edge of the front opening. Also the lens 50 has a prismatic portion in the area except for the areas N, namely, nearly within the central area including the optical axis, the portion of the lens 50 corresponding to the areas N takes the form of a transparent plate which has no prismatic function. The transparent front cover 14 is disposed on the front operation of the lamp housing 30 which houses the reflector 10 and protects the prismatic portion of the Fresnel lens.

According to the fifth and sixth embodiments having been described in the foregoing, the rays of light except for those going from the lamp bulb toward the central reflecting area or peripheral reflecting areas, that is, the rays of light emitted frontward from the lamp bulb, can be effectively utilized and the illuminances at the middle and low illuminance zones extending rightward and leftward from the center of the light distribution pattern (in the fifth embodiment) and that at the hot zone in the center of the light distribution pattern (in the sixth embodiment) ca be controlled.

Of course the automotive lamp assembly according to the present invention doesn't apply only to the headlamps having been explained in the foregoing but also as a fog lamp or driving lamp, and also it will be obvious to those skilled in the art that, depending upon a light distribution pattern required for each type of lamp, the luminous intensity distribution in the central zone (hot zone) and peripheral zones (middle and low illuminance zones) of the light distribution pattern can be freely set by making the most of the rays of light emitted from the lamp bulb.

While particular embodiments of the present invention are shown and described, it will be obvious to those skilled in the art that various changes and modification may be made without departing from the spirit of the present invention. The scope of the present invention is therefore to be determined solely by the appended claims.

What is claimed is:

1. An automotive lamp assembly, comprising;

a concave mirror having an optical axis and a lamp bulb disposed on said optical axis of said concave mirror, wherein said concave mirror is formed by a central reflecting area intersecting said optical axis and by peripheral reflecting areas continuously extending rightward and leftward from said central reflecting area, said central reflecting area being formed as a first reflecting curved surface consisting of a part of a paraboloid of revolution and which reflects the incident rays of light from said lamp bulb in directions parallel to said optical axis, and said peripheral reflecting areas being formed as second reflecting curved surfaces which reflect horizontally the rays of light emitted from said lamp bulb in directions convergent toward or divergent from said optical axis depending upon the distance from the vertical plane in which said optical axis lies and which also reflect vertically the rays of light in directions parallel to each other and to the horizontal plane in which said optical axis lies.

2. An automotive lamp assembly according to claim 1, wherein boundaries between said central reflecting area and said peripheral reflecting areas are laid in two vertical planes parallel to the vertical plane in which said optical axis lies and positioned symmetrically with respect to said optical axis, said second reflecting curved surface is formed by a plurality of elongated reflecting areas each consisting of multiple minute reflecting surface elements, and the multiple reflecting surface elements belonging to each of said reflecting areas are so orientated as to reflect the incident rays of light from said lamp bulb in a same directions.

3. An automotive lamp assembly according to claim 2, wherein the minute reflecting surface elements belonging to the two of the plurality of elongated reflecting areas forming said second reflecting curved surface that are positioned symmetrically with respect to the vertical plane in which said optical axis lies are so orientated as to reflect the incident rays from said lamp bulb in directions divergent from said optical axis with substantially same angles with respect to said optical axis.

4. An automotive lamp assembly according to claim 3, wherein each of the multiple minute reflecting surface elements forming said second reflecting curved surface are so orientated as to reflect the incident rays of light from said lamp bulb in directions more divergent from said optical axis as the multiple minute reflecting surface elements are more distant from the vertical plane in which said optical axis lies.

5. An automotive lamp assembly according to claim 2, wherein the minute reflecting surface elements belonging to the two of the plurality of elongated reflecting areas forming said second reflecting curved surface that are positioned symmetrically with respect to the vertical plane in which said optical axis lies are so orientated as to reflect the incident rays from said lamp bulb in directions convergent toward said optical axis with substantially same angles with respect to said optical axis.

6. An automotive lamp assembly according to claim 5, wherein each of the minute reflecting surface elements forming said second reflecting curved surface are so orientated as to reflect the incident rays of light from said lamp bulb in directions more convergent toward said optical axis as they are more distant from the vertical plane in which said optical axis lies.

7. An automotive lamp assembly according to claim 6, further comprising a lamp housing, to accommodate said concave mirror, said lamp housing having a circumferential edge extending substantially parallel to the rays of light reflected at said peripheral reflecting areas and which defines the front opening of said lamp housing, and a transparent front cover disposed covering the front opening of said lamp housing.

* * * * *